United States Patent [19]
Anthony

[11] Patent Number: 5,383,691
[45] Date of Patent: Jan. 24, 1995

[54] UNIVERSAL LOCKING CONNECTOR FOR HUMAN BREATHING SYSTEMS

[76] Inventor: Geoffrey P. Anthony, 308 Dromore Avenue, Winnipeg, Manitoba, Canada, R3M 0J5

[21] Appl. No.: 134,633

[22] Filed: Oct. 12, 1993

[30] Foreign Application Priority Data

Nov. 20, 1992 [CA] Canada ............................ 2083451

[51] Int. Cl.⁶ ........................................... H16L 19/03
[52] U.S. Cl. ................................ 285/325; 285/330; 285/352; 285/364
[58] Field of Search ............ 285/67, 70, 73, 364, 285/365, 406, 407, 330, 325, 352

[56] References Cited

U.S. PATENT DOCUMENTS

| | | |
|---|---|---|
| 398,829 | 3/1889 | Haberkorn . |
| 404,429 | 6/1989 | Pearce et al. . |
| 714,311 | 11/1902 | Lee ............................ 285/67 |
| 939,437 | 11/1909 | McVoy . |
| 944,503 | 12/1909 | Revaillot . |
| 1,044,183 | 11/1912 | Irwin . |
| 1,246,255 | 11/1917 | Fudge ......................... 285/67 |
| 1,611,286 | 1/1925 | Shaff . |
| 2,204,392 | 6/1940 | Arm . |
| 2,950,130 | 8/1960 | Schneider .................... 285/67 |
| 3,638,971 | 2/1972 | Smith .......................... 285/74 |
| 4,139,223 | 2/1974 | Clements .................. 285/365 X |
| 4,326,737 | 4/1982 | Lehmann .................. 285/365 X |

FOREIGN PATENT DOCUMENTS 2117570  7/1972  France ................................ 285/365

*Primary Examiner*—Dave W. Arola
*Attorney, Agent, or Firm*—Murray E. Thrift; Adrian D. Battison; Stanley G. Ade

[57] ABSTRACT

Connector connects two annular objects face-to-face. It may be used as a hose end coupling that connects two flanged hose ends end-to-end. It includes two components of the same configuration that connect directly to one another. Each a hose end flange preferably has a tapered back face and an O-ring seal fitted in a groove in the end face to engage an O-ring seal on the end face on the mating component. To hold the two end flanges together, two connector components of the same configuration are mounted on the respective end flanges. Each includes two part annular retainers that engage over the hose end flanges and urge them together. The web joining the two retainers has an offset section with teeth that engage similar teeth on the other connector component. The coupling is intended for use in breathing gas supply systems such as are used in medical applications.

18 Claims, 2 Drawing Sheets

UNIVERSAL LOCKING CONNECTOR FOR HUMAN BREATHING SYSTEMS

FIELD OF THE INVENTION

The present invention relates to a connector for connecting two annular objects. It is especially intended for use in breathing gas supply systems such as are used for the supply of breathing gases to medical patients, for example during surgical procedures and the like, although other uses are possible.

BACKGROUND

Connections in such systems are now made using push-fit connectors of rubber and metal or plastic, or using taper fit connectors of plastic or metal. These fittings will sometimes accidentally separate, compromising safety and putting a patient at risk. It is therefore desired to provide a positively locking connector for this purpose.

In order to provide for variable system configurations, the connector should be non-polarized so that each connector is directly connectable to every other connector. Other desiderata include ease of assembly, the absence of loose extra parts, a clear signal on locking, universal applicability in the breathing gas system and a small dead space in the connector.

The small dead space is beneficial in some applications, for example tracheal tube connections, where the tracheal tube can protrude through the connector to within the marrying component.

The present invention aims at the provision of a connector that will provide one or more of these desired characteristics.

SUMMARY

According to one aspect of the present invention there is provided a connector for connecting two annular objects arranged face-to-face, the connector comprising two components of the same configuration and having a coupled condition in which the two components are interlocked, each component comprising:

first and second part annular retaining members engageable with opposite sides of the two annular objects, and extending part way thereabout;

bridge means joining the two restraining members;

mounting means for mounting the component on a respective one of the annular objects; the mounting means being one of the first and second part annular retainer members provided with an additional circumferential extension so that the combined annular extent thereof is greater than 180°;

interlocking means engageable with the similar interlocking means of the other component to fasten the components together around the two annular objects.

The retaining members preferably have a tapered faces that engage mating tapered faces on the back sides of the two annular objects so that when the connector components are engaged, they wedge the two annular objects together. This is particularly effective when a resilient seal is provided between the two annular objects. The two objects themselves may be hose end flanges or they may be other components, for example a hose end and a fitting on a console or an instrument.

According to another aspect of the present invention there is provided a hose end coupling for connecting two hose ends end-to-end comprising two fittings of the same configuration having a coupled condition in which the two fittings are interlocked, each fitting comprising:

(a) a hose end component
   (i) an annular end flange with an end face; and
   (ii) annular, resilient seal means projecting from the end face; and (b) two connector components of the same configuration, each including
   (i) mounting means for mounting the connector component on the hose end component for free rotation thereon; and
   (ii) locking means comprising locking elements extending axially and circumferentially so as to engage in the coupled condition with the locking elements of the other component to hold the components together in the coupled condition.

The seal means may be a conventional O-ring seal held in an appropriate groove in the end face flange. The O-rings provide sufficient resiliency that the connector components may be rigid. To provide for a clear signal of engagement, the connector components preferably engage with an audible "snap".

The locking mechanism for joining the clamp parts preferably requires a double action to unlock so as to reduce the possibility of an unintended disconnection.

An embodiment of the invention will be described in the following by way of example, it being understood that the invention is not to be construed as limited to that embodiment.

BRIEF DESCRIPTION OF THE DRAWINGS

In the accompanying drawings which illustrate an exemplary embodiment of the present invention.

DETAILED DESCRIPTION

Figure 1:
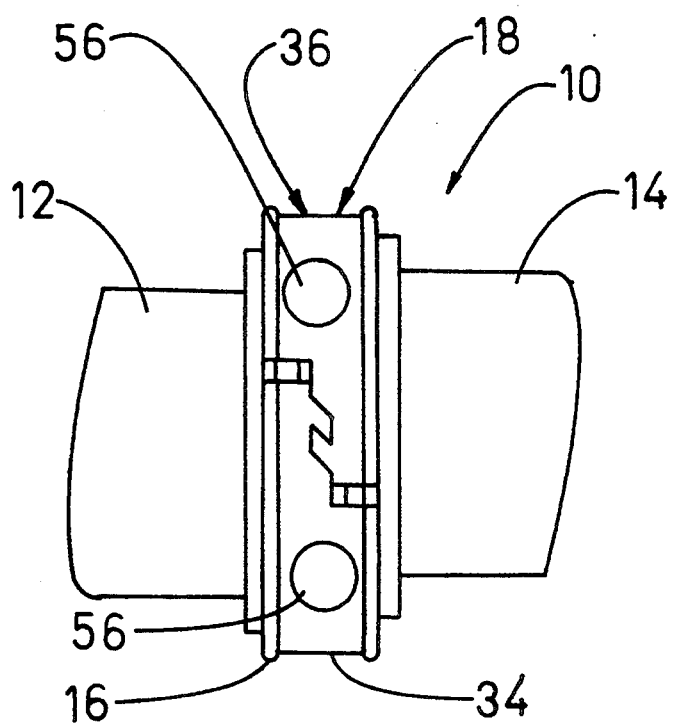
FIG. 1 is a side view of the connector in a coupled condition.
Figure 2:
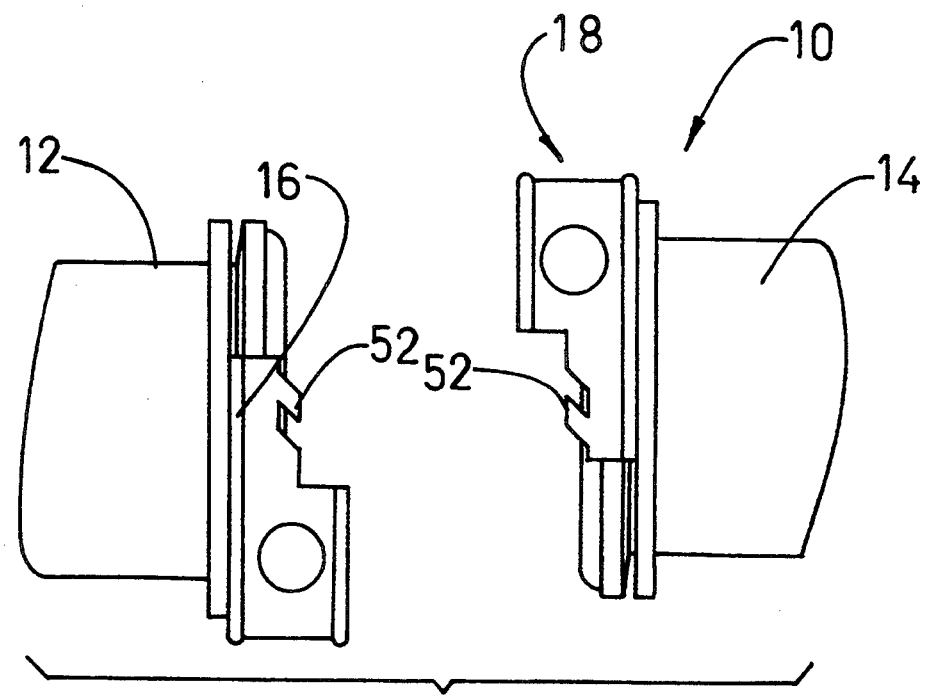
FIG. 2 is a side view of the connector in a uncoupled condition.

Referring to the accompanying drawings, and especially to FIGS. 1 and 2, there is illustrated a hose coupling 10 for connecting two hoses 12 and 14 end-to-end. The coupling includes two fittings 16 and 18 of the same configuration. Each fitting includes a hose end component and a connector component.

Figure 4:
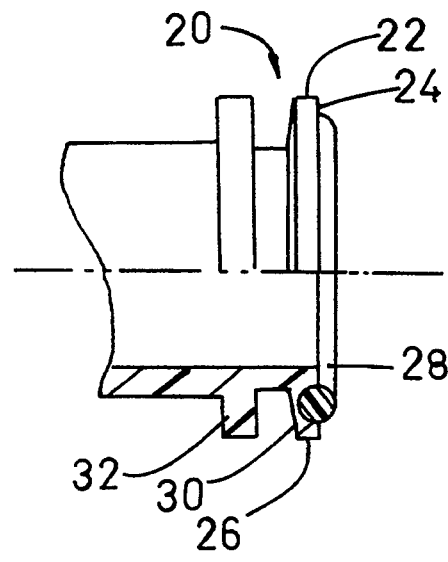
FIG. 4 is a side view of a hose end, partially in cross section.

As illustrated most particularly in FIG. 4, each hose end component 20 includes an annular flange 22 with a flat end face 24. The end face has an annular groove 26 forming a seat for an O-ring seal 28. The back face 30 of the flange 22 flares outwardly towards the end face 24. Spaced from the back face 30 is an annular flange 32.

Figure 3:
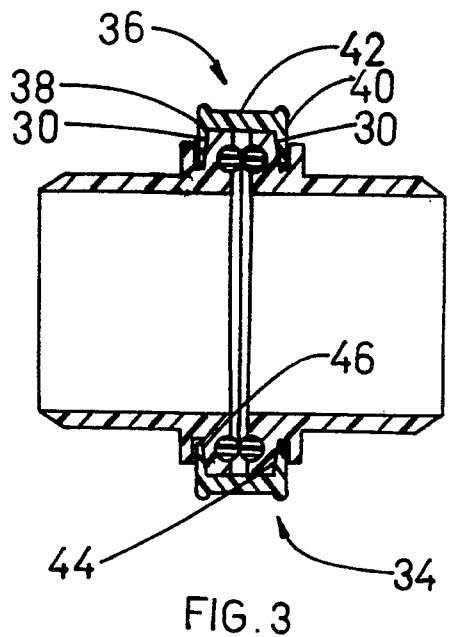
FIG. 3 is a cross-section of the connector in the coupled condition.

Cooperating with the hose end components are the two connector components 34 and 36. Like the hose end components, the two connector components are identical. Each connector component includes a part annular retainer 38 and a part annular retainer 40 coupled by a part cylindrical web 42. The retainer 38 is somewhat less than one-half of a complete circle in extent i.e., it has an angular extent less than 180°. The retainer 40 is complementary and slightly greater than one-half a circle in extent i.e., it has an angular extent greater than 180°. The retainer 40 with the annular extent greater than 180° functions as a mounting means for each connector component. The retainers have confronting radially outwardly convergent tapered faces 44 and 46 that engage, as illustrated most particularly in FIG. 3, with the back faces 30 of the flanges 22 of the hose end components 20.

Figure 5:
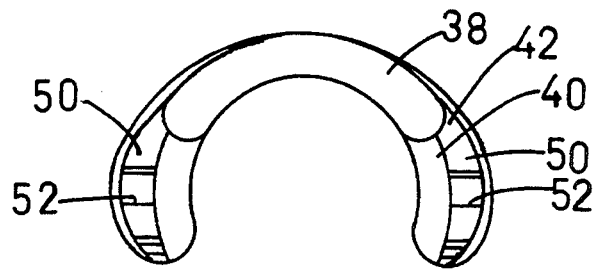
FIG. 5 is a front end view of a connector component.
Figure 6:
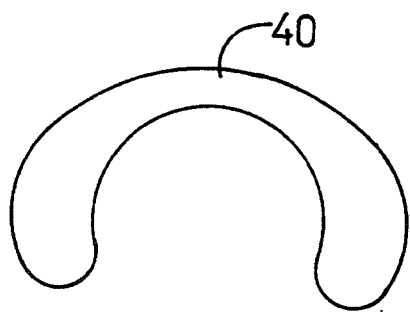
FIG. 6 is a back end view of the connector component.

On each of the connector components 34 and 36, the retainer 40 is somewhat oval in outer profile, as shown in FIGS. 5 and 6.

The retainer 40 engages in the groove between the back face 30 and the flange 32 of the associated hose end component to hold the two parts together.

Where the retainer 40 extends circumferentially beyond the retainer 38, the web has a portion with an extended circumferential extent. This provides a circumferential face 50 equipped with undercut teeth 52. The undercut formation is provided by arranging the teeth to project both radially and circumferentially from the web. Consequently, the teeth engage behind the teeth of the other connector component. Because the connector components are identical, this locking structure is found on both sides of the connector. Neither side is sufficient to hold the connector together. Indeed, if either side is disconnected, then the connector will spring apart.

The two connector components are provided with circumferential ribs on the outside of the web, opposite the two retainers. These are primarily for reinforcement purposes.

The connector components are equipped with slight depressions 56 in the webs, adjacent the opposite ends of the web. These serve as finger grips in disconnecting the connector.

Figure 7:
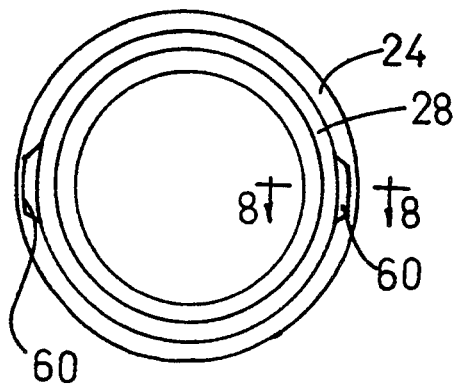
FIG. 7 is an end view of a hose end.
Figure 8:
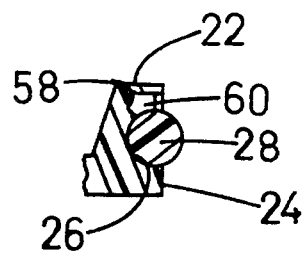
FIG. 8 is a view along line 8—8 of FIG. 7.

As illustrated most particularly in FIGS. 7 and 8, the groove 26 for the O-ring 28 is undercut at 58 to accommodate distortion of the O-ring under compression. Cut-aways 60 are formed at diametrically opposed positions to drain the undercut 58 and to allow entry of a tool to remove the O-ring for replacement.

In use of the coupling, the two hose ends are brought into engagement with one another, which places the two connector components 34 and 36 in confronting but not yet engaged positions. To engage the two parts, they are simply squeezed together so that the O-rings will yield and the teeth 52 of one part will snap into engagement with the teeth of the other. The audible snap provides a positive signal that proper engagement has been achieved. During connection the conic faces 30 engage mating conic faces 44 and 46 to provide a self-centering action as well as the desired axial compression of the ring seal. To disconnect the coupling, it is necessary to squeeze the connector to push the two connector components towards one another and then to twist the components away from one another using the finger depressions 56. In that this type of action is unlikely to occur by accident, the coupling is quite secure.

As will be appreciated, the connector components can rotate freely around the hose end before coupling so that torsional distortion in the hose is minimized.

Where it is desired to connect a hose end to a fixed fitting, for example on the console of an appropriate instrument, a complementary fitting may be provided on the console face.

While one embodiment of the present invention has been described in the foregoing, it is to be understood that other embodiments are possible within the scope of the invention. The invention is described in connection with its use for connecting parts of a breathing system, but other uses are possible. For example, the connector could be used as a safety closure for containers such as pill boxes. The invention is thus to be considered limited solely by the scope of the appended claims.

I claim:

1. A connector for connecting two annular objects arranged face-to-face, the connector comprising two components of the same configuration and having a coupled condition in which the two components are interlocked, each component comprising:
    first and second part annular retaining members engageable with opposite facing sides of the two annular objects, and extending part way thereabout;
    bridge means joining the two retaining members;
    mounting means independent of the other component for mounting the component on a respective one of the annular objects;
    interlocking means comprising undercut, axially facing teeth on the component engageable with teeth of the same configuration on the other component to fasten the components together around the two annular objects.

2. A connector according to claim 1 wherein the retaining members have confronting, outwardly convergent faces for engaging the oppositely facing sides of the respective annular objects.

3. A connector according to claim 1 wherein the bridge means comprises a part cylindrical web.

4. A connector according to claim 3 wherein the part cylindrical web has a first portion with an annular extent less than 180°, a second portion with an annular extent greater than 180° and a circumferential face joining the first and second portions.

5. A connector according to claim 4 wherein the undercut teeth project from the circumferential face.

6. A connector according to claim 1 wherein the mounting means comprises a part annular mounting member having an annular extent greater than 180°.

7. A connector according to claim 6 wherein the mounting member comprises one of the retaining members.

8. A hose end coupling for connecting two hose ends end-to-end comprising two fittings of the same configuration having a coupled condition in which the two fittings are interlocked, each fitting comprising:
    (a) a hose end component
        (i) an annular end flange with an end face and an annular back face that slopes radially outwardly towards the end face; and
        (ii) annular, resilient seal means projecting from the end face and engaging face to face with the seal means of the hose end component of the other fitting in the coupled condition; and
    (b) a connector component for each annular end flange, each connector component including
        (i) mounting means for mounting the connector component on the hose end component for free rotation thereon;
        (ii) two part annular confronting faces converging radially outwardly and engaging with the back faces of the end flanges in the coupled condition; and (iii) locking means comprising undercut, axially extending teeth engaging with the teeth of the other component and holding the components together against axial and radial separation in the coupled condition.

9. A coupling according to claim 8 wherein the confronting faces of the two connector components are aligned in the coupled condition of the coupling.

10. A coupling according to claim 8 wherein each connector component comprises two part annular retaining members on which the respective confronting faces are formed.

11. A coupling according to claim 10 wherein the mounting means comprise one of the retaining members.

12. A coupling according to claim 11 wherein each hose end component comprises retainer means spaced from the end flange and capturing one of the retaining members of the associated connector component between the end flange and the retainer means.

13. A coupling according to claim 12 wherein the retainer means comprise an annular flange.

14. A coupling according to claim 10 wherein one of the retaining members has an angular extent greater than that of the other retaining member.

15. A coupling according to claim 14 wherein each connector component comprises a web extending between the retaining members.

16. A coupling according to claim 15 wherein the locking teeth project from the web.

17. A coupling according to claim 8 wherein the annular end flange comprises an annular groove in the end face thereof, the seal means comprising an annular, resilient seal ring seated in the groove.

18. A coupling according to claim 17 wherein the seal ring is an O-ring.

* * * * *